United States Patent [19]

Baughman et al.

[11] 4,191,254

[45] Mar. 4, 1980

[54] APPARATUS AND METHOD FOR PLUGGING VOIDS IN A GROUND STRATUM

[76] Inventors: Kenneth E. Baughman, 5035 Grape, Houston, Tex. 77096; Earl N. Doyle, 1737 Campbell Rd., Houston, Tex. 77055

[21] Appl. No.: 869,707

[22] Filed: Jan. 16, 1978

[51] Int. Cl.² .............................................. E21B 33/13
[52] U.S. Cl. ..................................... 166/286; 166/117; 166/295; 175/72; 206/219; 206/524.7
[58] Field of Search .................. 206/219, 524.7, 524.1; 222/94, 95; 175/65, 72; 166/295, 292, 294, 162, 164, 309, 286, 117

[56] References Cited

U.S. PATENT DOCUMENTS

| | | | |
|---|---|---|---|
| 2,761,511 | 9/1956 | Billue | 166/295 X |
| 3,153,449 | 10/1964 | Lebourg | 166/295 X |
| 3,190,373 | 6/1965 | Weathersby | 206/524.7 X |
| 3,271,332 | 9/1966 | Bond et al. | 206/219 X |
| 3,339,716 | 9/1967 | Taylor | 206/219 |
| 3,340,873 | 9/1967 | Solowey | 206/219 X |
| 3,379,253 | 4/1968 | Chism | 166/295 |
| 3,417,824 | 12/1968 | Van Poollen | 175/72 X |
| 3,637,019 | 1/1972 | Lee | 166/295 |
| 3,739,947 | 6/1973 | Baumann et al. | 206/219 X |
| 4,083,406 | 4/1978 | Metz | 166/162 X |

Primary Examiner—Stephen J. Novosad
Attorney, Agent, or Firm—Hubbard, Thurman, Turner, Tucker & Glaser

[57] ABSTRACT

Apparatus and method of filling voids in a ground stratum in the vicinity of a well bore are enclosed. The apparatus is a self-contained device and, for example, it can be placed in the well bore in the vicinity of the voids to be plugged by dropping the apparatus down a drill string. Once in place it will automatically respond to the well pressure to provide the required plugging. To accomplish this the apparatus includes precursors of polymers such as precursors of polyurethanes, epoxy type polymers, polyesters or other polymers which are released from the apparatus and flow into the voids.

20 Claims, 6 Drawing Figures

APPARATUS AND METHOD FOR PLUGGING VOIDS IN A GROUND STRATUM

This invention relates to drilling oil and gas wells or pipelines through voids in ground strata, and in one of its aspects, to a method and apparatus for filling voids in ground strata in the vicinity of a well bore hole. In another aspect it relates to a self-contained device for responding to a surrounding pressure to provide a plugging medium.

In drilling oil and gas wells, drilling muds are circulated under pressure to lubricate and cool the drill bit and to carry away cuttings. Losses of drilling mud or other drilling fluid may occur as the result of various underground voids such as cracks, holes, fissures in the geographical formations, water sands, or any other structure that would permit the loss of drilling mud, and this phenomenon is generally referred to as "lost circulation". When sufficient lost circulation occurs to impair the drilling operation, drilling generally halts until the sources of the lost circulation can be plugged.

Lost circulation has been a long standing problem. In the past, the primary approach to solving lost circulation has been to pull the drill string and then plug the hole in the vicinity of the voids with a substance that can be handled in a liquid state until it is in place and which will then harden in place, such as concrete or polyurethane foam. Once the plugging substance has hardened, it is then drilled through. A major problem with such approaches, in addition to the lost drilling time and costs associated with pulling the drill string, has been keeping the plugging substance in a liquid state until the substance is in place. One method of using polyurethane foam for plugging voids was to mix the precursors of the polymeric system on the surface and rapidly force the foam downhole by pressure or by a plug which is generally known as a "pig". This process is very costly, necessitating a standby crew and equipment on a constant basis. In premixing the foam producing materials at the surface, a retarding agent can also be included allowing more time to get the premixed foam into place, as shown in U.S. Pat. No. 3,379,253, issued to Chism. Another approach is to pump the different required chemicals down separate pipes so that they mix forming the stable foam in the vicinity of the voids as shown in Chism and in U.S. Pat. No. 3,637,091, issued to Lee, but this approach requires the lowering and withdrawing of large amounts of special equipment into the bore hole. Withdrawing the special equipment from the bore hole once the foam has begun to solidify can be difficult or even impossible.

It is thus an object of the present invention to provide an apparatus for plugging voids in a ground stratum which is self-contained, not requiring other equipment or elaborate procedures for its use.

Another object of the present invention is to provide an apparatus and method for plugging voids in a ground stratum which permits the plugging substance to be positioned adjacent the voids to be filled while it is still in a liquid state.

Another object of this invention is to provide an apparatus and method of plugging voids in a ground stratum in the vicinity of a well bore during a well drilling operation without the necessity of pulling the drill string.

Another object of this invention is to provide such an apparatus and method which is relatively inexpensive to manufacture, can be easily stored until useage, and which can be used in the field without the necessity of highly trained personnel or expensive or elaborate equipment.

In accordance with these and other objects of this invention, which will be apparent from consideration of this specification and the appended claims, the present invention provides a self-contained, sealed cartridge with separate chambers for containing the precursors of a polymeric system. The cartridge is designed so that the precursors are kept separated until it is in the vicinity of voids in a ground stratum which cause loss of circulation. When the cartridge reaches the vicinity of the voids to be plugged, the pressure about it causes a breakdown of the structure separating the precursors, allowing the precursors to mix, and as the precursors mix, the resultant foam is released from the cartridge into the voids to be plugged where it solidifies.

In accordance with one aspect of the invention, a flexible or collapsible cartridge includes a plurality of storage chambers, each for containing a precursor of a polymeric system, and at least one mixing chamber. The precursors of the polymeric system are kept in their individual storage chambers until the cartridge is in the vicinity of the voids to be plugged, at which time the components are forced by pressure from drilling mud to enter the mixing chamber and mix, forming a foam which is then released from the flexible cartridge into the bore hole and the voids to be plugged. Once in the voids, the foam sets, hardening into a substance which is substantially impervious to the drilling mud so that drilling can be resumed.

In accordance with another aspect of the invention, a cartridge includes a plurality of storage chambers each for containing a precursor of a polymeric system, at least one chamber for mixing the precursors, and plungers within the cartridge for transmitting increased pressures from outside the cartridge to the precursors of the polymeric system forcing the precursors into the mixing chamber when the pressure outside the cartridge is sufficiently great.

BRIEF DESCRIPTION OF THE DRAWINGS

For a more complete understanding of the present invention and for objects and advantages thereof, reference may now be made to the following description taken in conjunction with the accompanying drawings in which.

DESCRIPTION OF THE PREFERRED EMBODIMENTS

Figure 1:
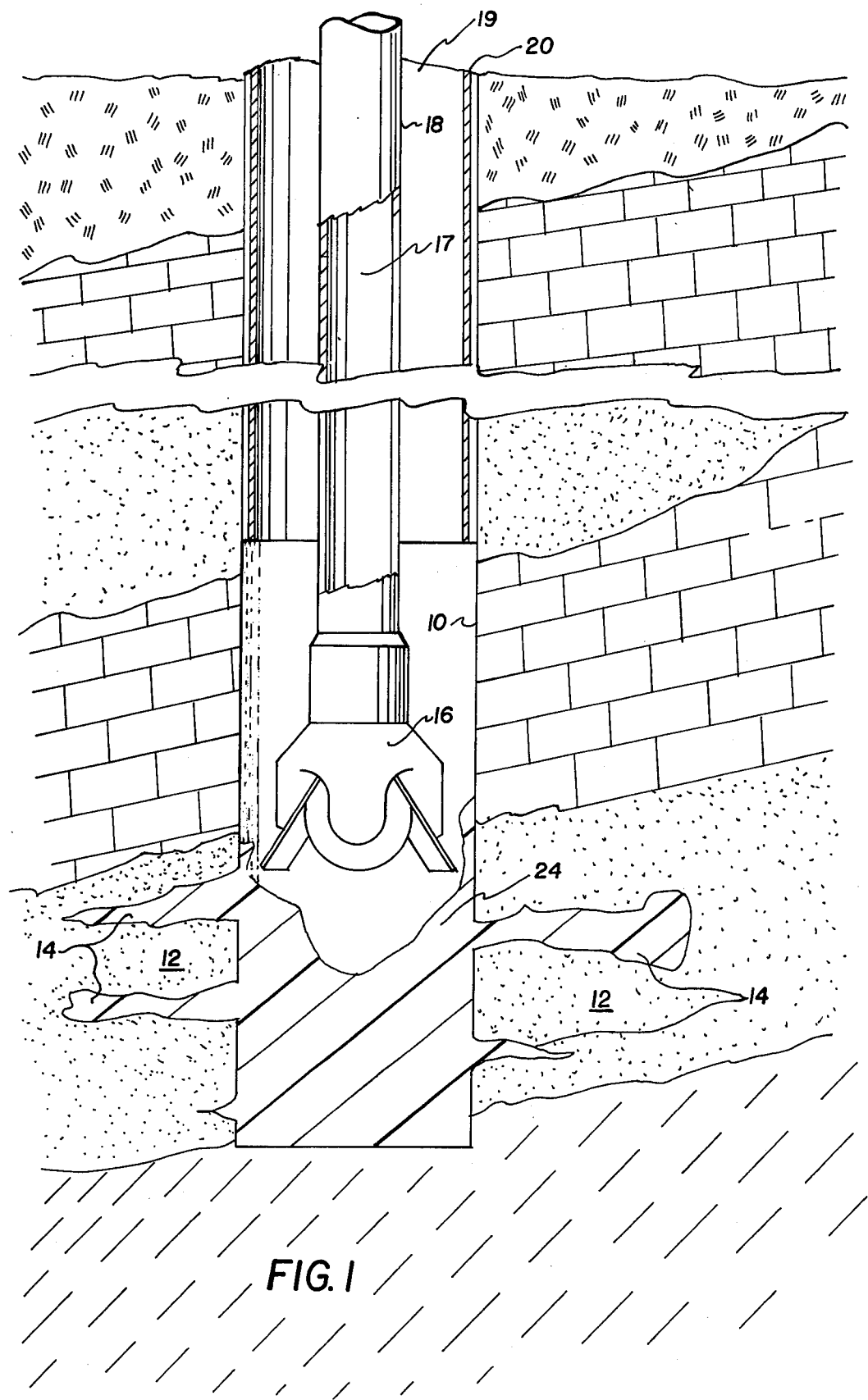
FIG. 1 is an elevational view in partial section of a well in which foam has been used to plug voids in accordance with this invention.

Referring now to FIG. 1, a bore hole 10 extends into a stratum 12 with many voids, in this case fissures 14, which have been plugged in accordance with this invention with a polymeric foam 24. A drill bit 16 driven by a drill string 18 having a center bore 17 is used to drill the bore hole 10 until it drills into the stratum 12 with fissures 14. In drilling through the other strata, drilling mud is circulated down through hollow drill string 18 through drill bit 16 to cool and lubricate drill bit 16 as it drills. The mud then goes back up the annulus 19 between drill string 18 and a casing 20, as is well known in the art. By continuously circulating the drilling mud, adequate pressure is maintained to cool and lubricate drill bit 16 and to remove drilling waste from the vicinity of drill bit 16. Once drill bit 16 drills into a stratum with voids in the stratum so that the drilling mud will flow into the stratum rather than back up through the annulus, circulation is lost, and drilling must cease. When the voids in a stratum which are causing loss of circulation have been plugged in the vicinity of bore hole 10 by foam 24 as shown in FIG. 1, and the foam has set, then drilling can be continued, drilling first through the foam in the well bore. The foam, which is substantially impervious to the drilling mud, then prevents further loss of circulation where it has been used.

Figure 2:
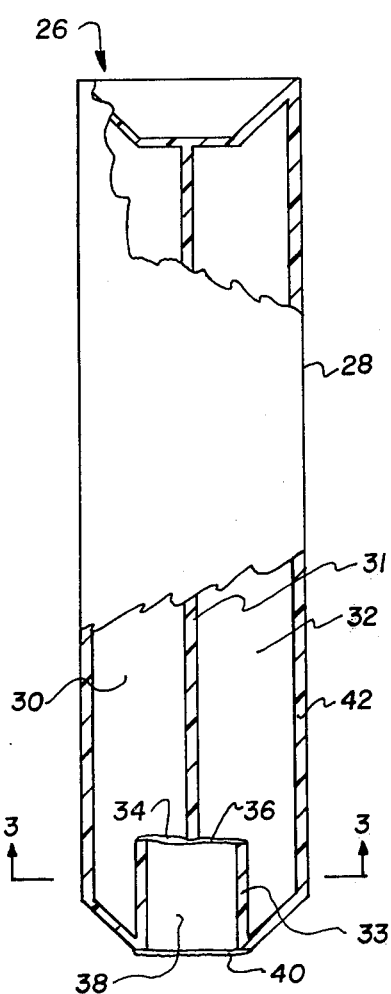
FIG. 2 is an elevational view of an apparatus utilizing this invention.
Figure 3:
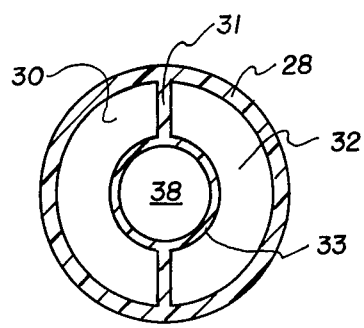
FIG. 3 is a view of the cartridge taken along lines 3—3 of FIG. 2.

Referring now to FIGS. 2 and 3, a plugging material transporting, mixing and releasing apparatus 26 constructed according to this invention comprises a cartridge 28 made of a flexible, and preferably water-soluble, substance so that it will yield or collapse in response to increased pressure from outside the cartridge. The cartridge includes means for separating the precursors of a polymeric system such as storage chambers 30 and 32, which are separated from each other by a wall or partition 31 extending through the center of cartridge 28, a cylinder wall 33, and membranes 34 and 36 located at the lower portion of cartridge 28. Thus, when one precursor of a two precursor polymeric system is placed in chamber 30, the chamber in conjunction with membrane 34 completely encloses that precursor making it shelf-stable. Similarly the other precursor of a two precursor polymeric system is enclosed in storage chamber 32 which is closed at the bottom by membrane 36. The two precursors remain separate and stable until such time as the cartridge is to be used.

Membranes 34 and 36 are preferably made of a flexible material, such as a thin rubber-like material, which can be readily ruptured by the pressure of the material in chambers 30 and 32 when the well pressure causes collapse of cartridge 28 as hereinafter explained.

Cartridge 28 also includes a mixing chamber 38 formed by cylindrical wall 33, membranes 34 and 36, and a rupturable membrane 40 at the bottom of cartridge 28 for mixing the precursors of the polymeric system. Mixing chamber 38 is separated from the storage chambers by membranes 34 and 36 prior to their rupture. As noted, the outer wall 42 of cartridge 28 is made of a flexible material so that outside pressure on wall 42 will tend to collapse the cartridge and increase the pressure on membranes 34 and 36. When sufficient pressure is applied to the outer wall of cartridge 28, membranes 34 and 36 will burst and fill mixing chamber 38 with the two stored precursors which begin to mix. As they mix the pressure in the mixing chamber increases until membrane 40 is ruptured and the foaming substance flows out of the chamber.

Once the precursors of the polymeric system have begun mixing, they are forced out of the cartridge and into the well bore and the fissures to be plugged. Forcing the foam out of the cartridge can be accomplished in a number of ways such as including a blowing agent in one precursor, or mixing precursors which expand when mixing such as self-foaming precursors, or mixing components which expand when mixed with the water of the drilling mud or the formation. As used here, "precursor of a polymeric system" includes known blowing agents and catalysts. The foam can also be forced out of the cartridge with the force of the drilling mud as will be explained.

Figure 4:
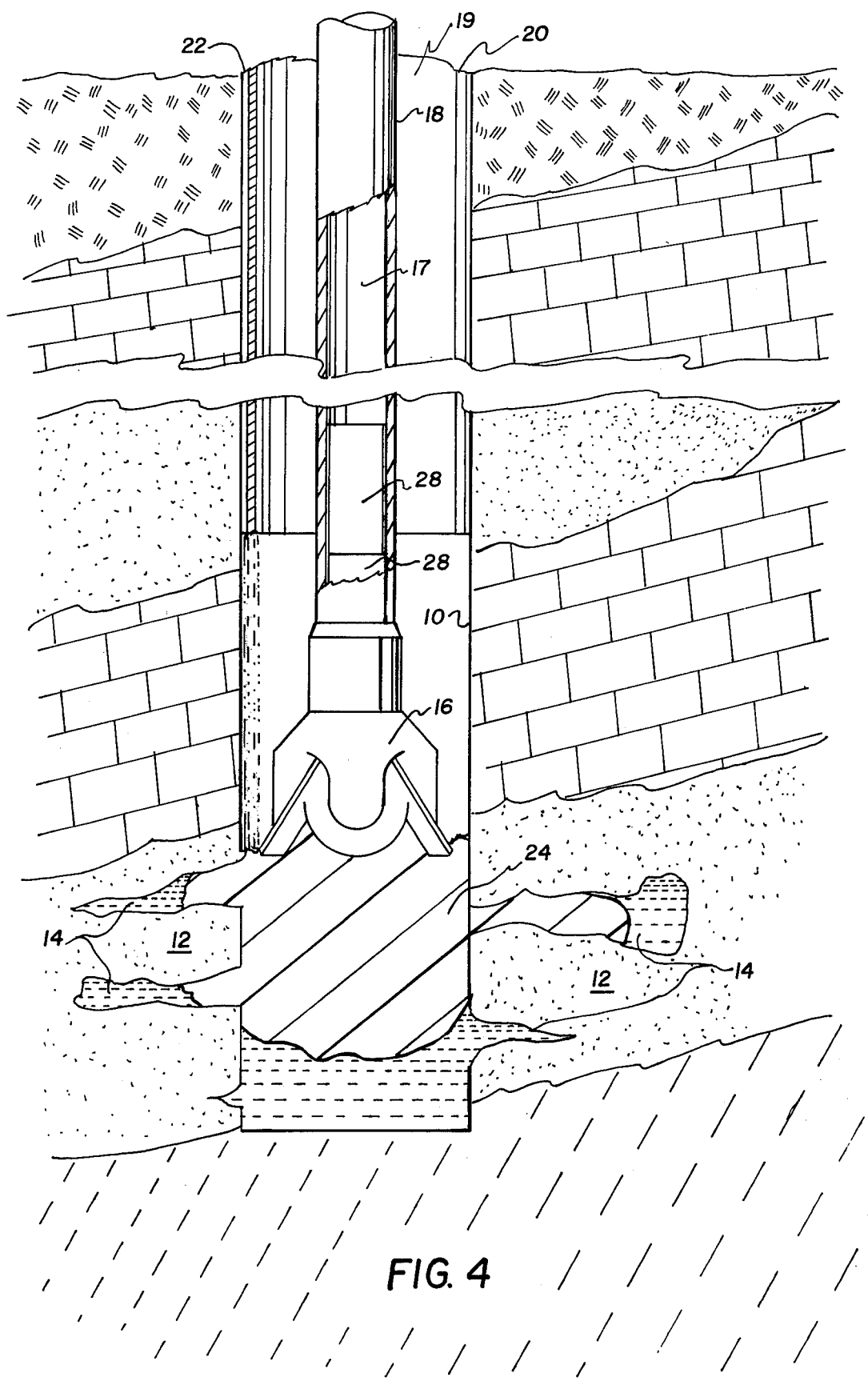
FIG. 4 is an elevational view in partial section of a well in which foam is being forced in a liquid state into voids in accordance with this invention.

The preferred method of using the present invention is to drop one or more cartridges which are cylindrically shaped and suitable for stacking down the drill string so that the cartridges 28 will stack one on top of another at the bottom of the drill string as shown in FIG. 4. A suitable number of cartridges may be determined by estimating the amount of foam which will be necessary to fill the voids which are creating the problem, though it may be necessary to limit the number of cartridges used at any one time due to the practicalities of forcing the cartridges and foam out of the drill string with the use of drilling mud. The volume expansion ratio for precursor to polyurethane foam for some precursors is in the range of 20 to 1.

In employing this invention, drill string 18 is generally pulled up bore hole 10 until drill bit 16 is slightly above the stratum to be plugged, as shown in FIG. 4, and then cartridges 28 are dropped as described down the inside of drill string 18. After sufficient numbers of the cartridges have been dropped into drill string 18, drilling mud is forced down the drill string so that the pressure of the mud flow tends to both rupture the membranes and force the foam out through drill bit 16 and into well bore 10. As shown in FIG. 4, pressure from drilling mud forced down drill string 18 onto cartridges 28 forces liquid state foam 24 into fissures 14, thus displacing any liquid such as water or drilling mud that might be in fissures 14. Sufficient drilling mud is forced down drill string 18 through drill bit 16 to ensure that foam 24 does not set while in drill bit 16. Foam 24 is preferably substantially removed from drill bit 16, as shown in FIG. 1, before setting.

Using the preferred method of this invention, it is especially advantageous to make the cartridges themselves of a soluble material such as water soluble cardboard or polyvinyl alcohol, hydroxyethyl cellulose, hydroxymethyl cellulose, carboxyethyl cellulose, carboxymethyl cellulose, polyethylene oxide, or other known water soluble materials suitable for making containers. Thus, once the drilling mud is forced down on top of the cartridges which are inside the drill string, the cartridges dissolve and can be forced with the foam through drill bit 16. Also, it is preferred that a retarding agent be added to the precursors (as is well known in the art) to ensure that the foam does not set until it has completely evacuated cartridges 28 and drill bit 16 and is in place in the voids to be filled.

Figure 5:
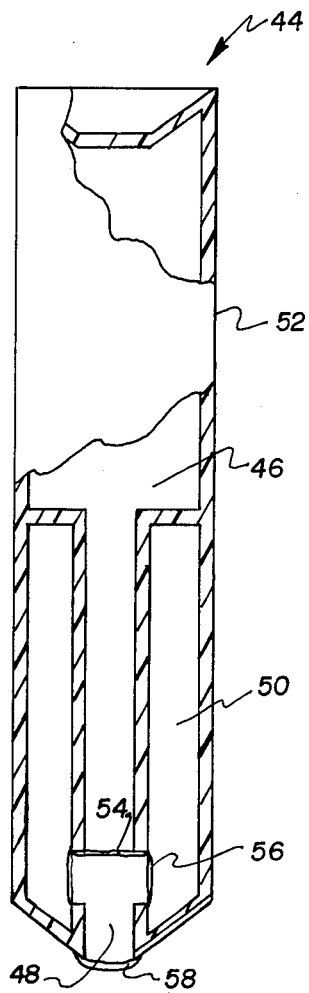
FIG. 5 is an elevational view in partial cutaway of another embodiment of this invention.

Referring now to FIG. 5, another embodiment 44 of the present invention is illustrated where storage chamber 46 is partially an extension of a mixing chamber 48, and a second storage chamber 50 is annular to the first storage chamber 46. As in the previous embodiment, the collapse of flexible container 52 in response to the down hole pressure causes the rupture of membranes 54 and 56 which had sealed chambers 46 and 50 respectively. Once the precursors of the polymeric system begin mixing in mixing chamber 48, they then rupture membrane 58 and are released into the bore hole and fissures.

Figure 6:
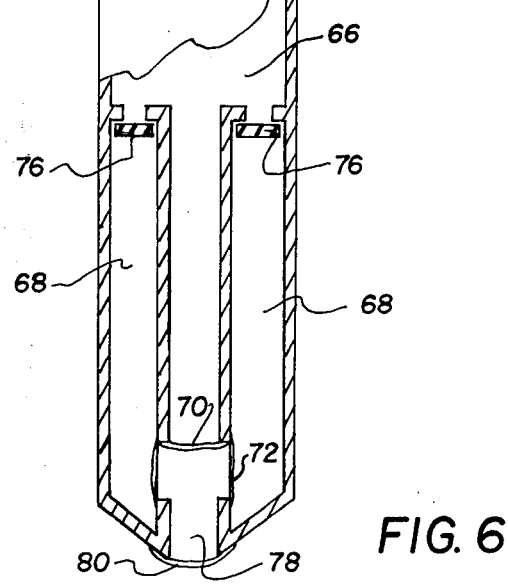
FIG. 6 is an elevational view in partial cutaway of an embodiment of this invention utilizing plungers.

In addition to the use of a collapsible cartridge other methods and apparatus can be used for transmitting the down hole pressures to the components of the polymeric system to cause the rupture of the membranes separating the precursors and allow the mixture of the precursors. One such apparatus uses plungers for transmitting the pressure from the environment about the cartridge to the precursors stored within the cartridge as shown in FIG. 6. The apparatus of this embodiment, referred to generally as 62, includes a rigid cartridge 64 with storage chambers 66 and 68 with corresponding membranes 70 and 72 separating chambers 66 and 68 respectively, until ruptured from a mixing chamber 78. A rigid plunger 74 forms one end of chamber 66 and transmits pressure from outside cartridge 64 to the precursor of chamber 66. A ring-shaped plunger 76 separates chamber 66 from chamber 68 and transmits pressure from the precursor in chamber 66 to the precursor in chamber 68 since an increase in the pressure on the outside of cartridge 64 is transmitted to the precursor in chamber 66 by plunger 74, and the increase in pressure that results in the precursor of chamber 66 will be transmitted to the precursor in chamber 68 through plunger 76. The increased pressure in the chambers will rupture membranes 70 and 72, thus allowing the precursors of the polymeric system to mix in mixing chamber 78. As the precursors mix in mixing chamber 78 and increase the pressure therein, membrane 80 will rupture and the mixed material will flow into the well bore and fissures.

Thus, a self-contained cartridge with two compartments for a two-part, or two component polymeric systems such as polyurethane foam, expoxy foam, polyester foam, etc. or for solid polymeric systems has been described. The cartridge is remotely actuated as in down-hole oil and gas wells, and underground oil and gas pipe lines, by pressure. The pressure may be air, water, gas, oil, etc. The two component polymeric system is packaged in the two separate compartments, and most such systems will be shelf-stable for from six months to one year as a minimum.

Besides the described use in plugging holes and fissures in drilling operations, the present invention has many other ramifications. In oil and gas wells, many times a certain zone must be plugged off, as when one of the productive zones no longer is producing, or is producing too much water or other unwanted product. The present invention is applicable in such uses. In oil or gas wells that are highly corrosive, many times the tubing will have holes due to corrosion which must be sealed off. In pipelines, for water, sewage, oil, gas, and other products, holes in the line due to corrosion must be sealed. The present invention is applicable for all these types of operations plus many others.

Also, although it is preferred that the cartridge be made of water-soluble material, in a drilling operation, the cartridge is of such light construction that once the fluid components have been mixed and dispensed, the cartridge itself can be forced on through the ports or orifices in the drill bit and ground up into tiny pieces which are carried on with the drilling mud. In other instances, it may be desirable that the cartridge construction be strong enough that the empty cartridge may be pushed on through a pipeline, and be reclaimed intact on the other end, after having performed its function of sealing holes or leaks.

It is understood, therefore, that these cartridges may be constructed of many different plastic materials so as to be very fragile, or very strong. It is even possible to construct them of steel or other metal if so desired, for some specific uses, where the cartridge may be used over and over again.

Also, the polymeric materials to be utilized in such cartridges may be any type of thermosetting polymer, such as polyurethane, epoxy, polyester, urea-formaldehyde, phenolic, etc. where two or more components must be intimately mixed together in order to form a polymer. The polymer may be used as a solid material in uses where the end product must be very strong, or the polymer may be a foamed polymer of any given density. Such formulations are well-known in the art with all such thermosetting polymers.

Cartridges may also be made of a water-soluble material if desired, such as ethylene oxide polymer, or polyvinyl alcohol polymer, or they may be made of an oil soluble polymer, such as styrene-maleic anhydride or other such polymer. They also may take many other forms other than described herein.

From the foregoing it will be seen that this invention is one well adapted to obtain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A container for storing at least two liquid precursors capable of forming a polymeric foam when mixed, and for transporting and mixing said precursors and dispensing same when mixed to form said foam outside the container, comprising, in combination;
   at least two storage chambers formed within said container and separated from each other to separately store each of said precursors;
   a mixing chamber including at least one inlet for receiving said precursors, said container being adapted so that when placed in an environment where the pressure surrounding it exceeds a predetermined amount each precursor will be driven towards said mixing chamber; and
   means separating the inlet of said mixing chamber from each of said storage chambers and adapted to be ruptured by the pressure of each of the precursors as it is driven towards said mixing chamber to permit the precursors to enter said mixing chamber and be mixed together to form the polymeric foam.

2. The container of claim 1 wherein the material of which the container is made is collapsible whereby pressure external of the container causes the outside of the container to collapse to drive the precursor to the mixing chamber.

3. The container of claim 2 wherein each of the storage chambers is separated from said mixing chamber by a rupturable membrane.

4. The container of claim 2 wherein the material of which said container is made is water-soluble.

5. The container of claim 4 wherein the material of which said container is made is selected from a group consisting of polyvinyl alcohol, hydroxyethyl cellulose, hydroxymethyl cellulose, carboxyethyl cellulose, carboxymethyl cellulose or polyethylene oxide.

6. The container of claim 1 wherein each of the storage chambers is separated from said mixing chamber by a rupturable membrane.

7. The container of claim 1 including two storage chambers and wherein a first plunger is provided in one of said storage chambers to be responsive to the pressure outside said container, and a second plunger is provided in the other of said storage and is responsive to the pressure applied to the precursor stored in one of said storage chambers by said first plunger.

8. The container of claim 1 wherein the material of which said container is made is water-soluble.

9. The container of claim 8 wherein the material of which said container is made is selected from a group consisting of polyvinyl alcohol, hydroxyethyl cellulose, hydroxymethyl cellulose, carboxyethyl cellulose, carboxymethyl cellulose or polyethylene oxide.

10. A container for storing precursors of a polymeric foam in liquid state for mixing and releasing the precursors to form a solid material outside the container, said container adapted to be stored and transported without such mixing and releasing of the precursors and then placed for use in an environment where it is at least partially surrounded by a fluid under pressure, said container comprising in combination:
  means within said container for separating and storing the precursors,
  means responding to the fluid pressure about said container when it exceeds a predetermined pressure for causing mixing of the precursors and subsequent releasing of the mixed precursors from the container to form a solid foam,
  whereby by placing the container adjacent an area to be filled with foam and applying a pressure to the outside of the container, a solid foam can be directed into said area to be filled.

11. A container according to claim 10 wherein the container is flexible whereby the flexing of the container resulting from the pressure outside of the container exceeding a predetermined pressure causes the precursors to mix.

12. A container for storing precursors of a polymeric foam in a liquid state and for mixing and releasing the precursors to form a solid material outside the container comprising, in combination;
  means within said container for separating and storing the precursors, and
  means responding to the pressure about said container for causing mixing of the precursors and subsequent releasing of the mixed precursors from the container, said means for causing mixing of the precursors including at least one plunger adapted to respond to the pressure about the container to mix, whereby by placing the container adjacent an area to be filled with foam and applying a pressure to the outside of the container, a solid foam can be directed into said area to be filled.

13. A method of drilling a bore hole using a drill bit and a hollow drill string in the presence of a ground stratum with voids causing lost circulation comprising, in combination:
  pulling the drill string up the bore hole until the drill bit is substantially above the stratum;
  putting at least one cartridge containing separated precursors of a polymeric foam down the drill string into the vicinity of the drill bit;
  forcing drilling mud down the drill string, thereby collapsing the cartridge and mixing the precursors;
  continuing to force drilling mud down the drill string until the polymeric foam is forced out of the drill string and into the voids;
  allowing the polymeric foam to set; and
  drilling through the ground stratum.

14. The method of claim 13 wherein each of the cartridges employed is made of a flexible, collapsible material.

15. The method of claim 14 wherein each of the cartridges employed is also made of a water-soluble material.

16. The method of claim 16 wherein each of said cartridges is made of a material selected from the group consisting of polyvinyl alcohol, hydroxyethyl cellulose, hydroxymethyl cellulose, carboxyethyl cellulose, carboxymethyl cellulose or polyethylene oxide.

17. The method of claim 13 wherein each of the cartridges employed is made of a water-soluble material.

18. The method of claim 15 wherein each of said cartridges is made of a material selected from the group consisting of polyvinyl alcohol, hydroxyethyl cellulose, hydroxymethyl cellulose, carboxyethyl cellulose, carboxymethyl cellulose or polyethylene oxide.

19. A method of dispensing a solid foam as it is forming from a container, comprising the steps of:
  separately storing at least two liquid precursors in said container which are capable of forming the desired foam when combined in said container;
  placing the container adjacent to the area to receive the solid foam material;
  flowing a fluid under pressure about said container,
  utilizing the pressure of said fluid to force the two precursors to mix together and simultaneously be driven out of the container into the area to receive the solid foam material; and
  permitting the foam material to set in said area.

20. The method of claim 19 further including the step of adding a retarding agent to one of said precursors while being stored in said container to prohibit the solidifying of said foam material until a predetermined time after it has been dispensed from said container.

* * * * *